Figure 3:
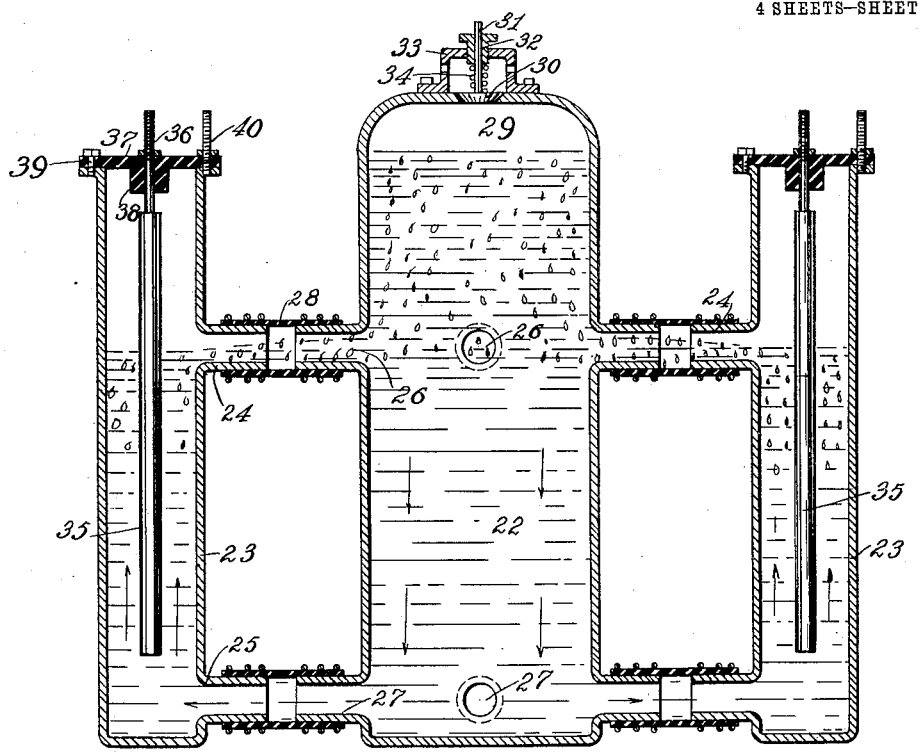

C. C. RUPRECHT.
METHOD OF AND APPARATUS FOR RECTIFYING ELECTRIC CURRENTS.
APPLICATION FILED APR. 20, 1908.
1,059,003.
Patented Apr. 15, 1913.
4 SHEETS—SHEET 1.
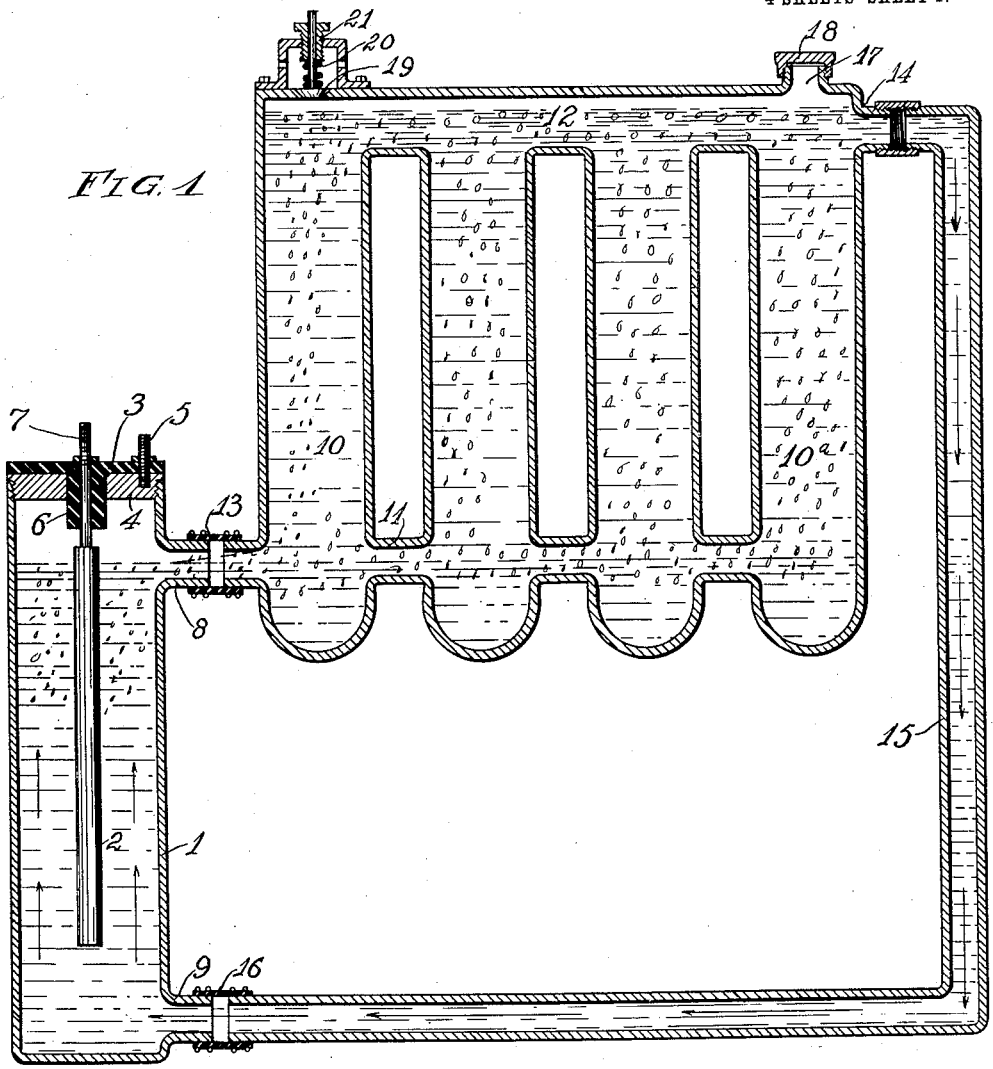
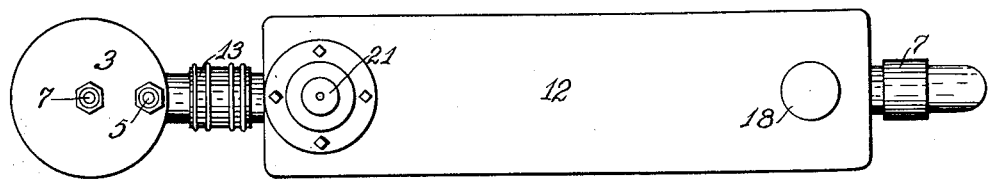
WITNESSES:
Arthur S. Remsberg
Brennan B. West
INVENTOR,
Charles C. Ruprecht.
BY Bates, Fouts & Hull
ATTYS.

C. C. RUPRECHT.
METHOD OF AND APPARATUS FOR RECTIFYING ELECTRIC CURRENTS.
APPLICATION FILED APR. 20, 1908.

1,059,003.

Patented Apr. 15, 1913.
4 SHEETS—SHEET 2.

WITNESSES:
Arthur S. Remsberg
Brennant D. West

INVENTOR,
Charles C. Ruprecht.
BY Bates, Fouts & Hull,
ATTYS.

C. C. RUPRECHT.
METHOD OF AND APPARATUS FOR RECTIFYING ELECTRIC CURRENTS.
APPLICATION FILED APR. 20, 1908.

1,059,003.

Patented Apr. 15, 1913.
4 SHEETS—SHEET 3.

WITNESSES:
Arthur S. Remsberg.
Brennan S. West.

INVENTOR,
Charles C. Ruprecht.
BY Bates, Fouts & Hull,
ATTYS.

C. C. RUPRECHT.
METHOD OF AND APPARATUS FOR RECTIFYING ELECTRIC CURRENTS.
APPLICATION FILED APR. 20, 1908.
1,059,003.
Patented Apr. 15, 1913.
4 SHEETS—SHEET 4.
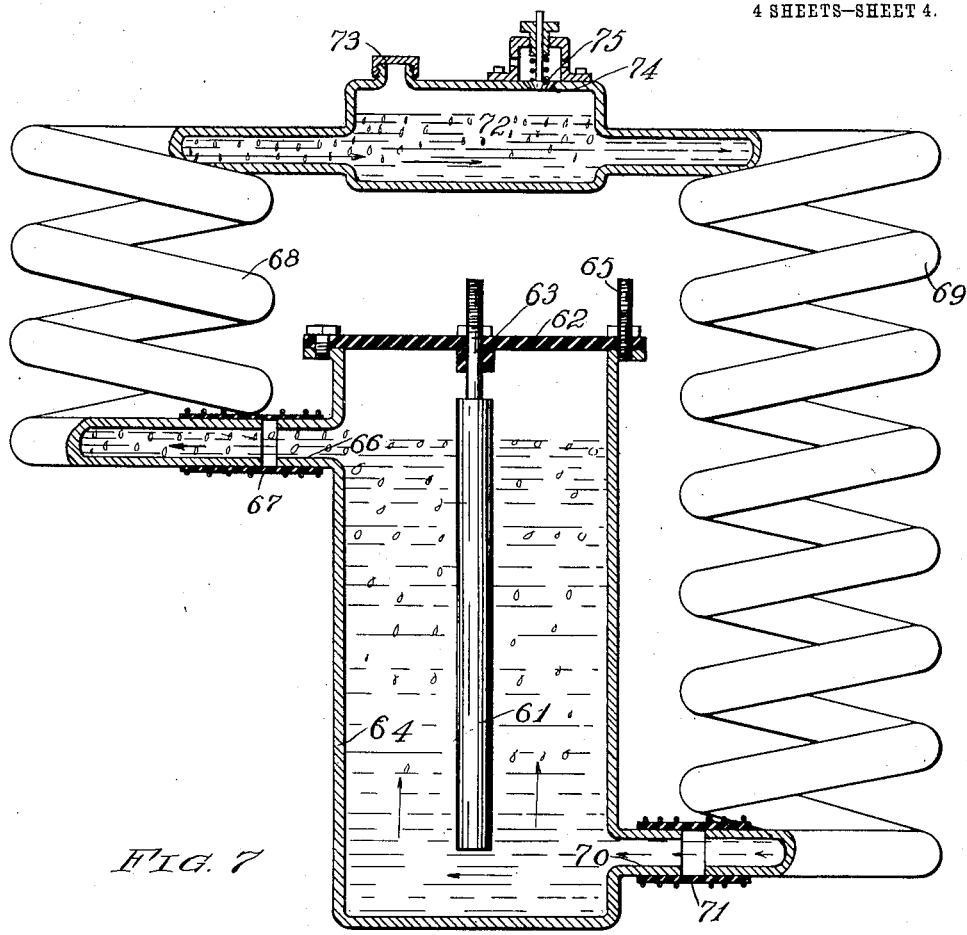
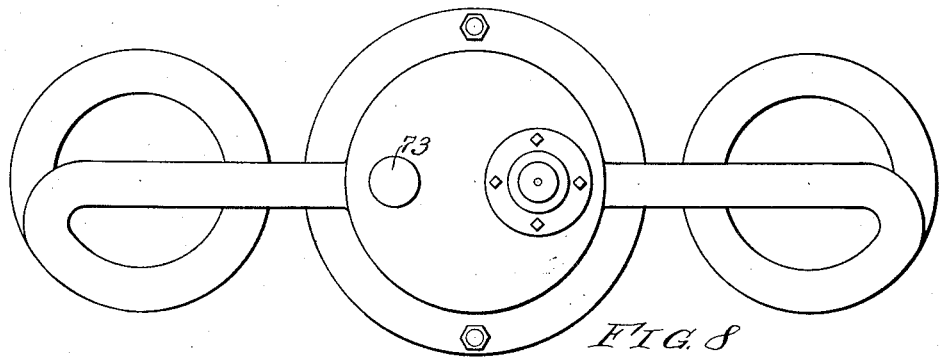
WITNESSES:
Arthur S. Remsberg.
Bremmant B. West.
INVENTOR,
Charles C. Ruprecht,
BY Bates, Fouts & Hull.
ATTYS.

UNITED STATES PATENT OFFICE.

CHARLES C. RUPRECHT, OF CLEVELAND, OHIO.

METHOD OF AND APPARATUS FOR RECTIFYING ELECTRIC CURRENTS.

1,059,003. Specification of Letters Patent. Patented Apr. 15, 1913.

Application filed April 20, 1908. Serial No. 428,058.

*To all whom it may concern:*

Be it known that I, CHARLES C. RUPRECHT, a citizen of the United States, residing at Cleveland, in the county of Cuyahoga and State of Ohio, have invented a certain new and useful Improvement in Methods of and Apparatus for Rectifying Electric Currents, of which the following is a full, clear, and exact description, reference being had to the accompanying drawings.

This invention relates to the rectification of electric currents, and has for its object the provision of a method of rectification which will increase the efficiency of such rectifiers while preventing the polarization and overheating of the electrolyte (where a liquid electrolyte is employed) as well as of the electrodes; also the production of an apparatus and an electrolyte by the employment whereof the method may be economically and efficiently carried out.

The apparatus, illustrated in three modifications herein, comprises generally a pair of rectifier electrodes, a cell communicating therewith, and means for maintaining the electrolyte under pressure. In the embodiment of my invention disclosed herein, one electrode surrounds the other and has formed therein a closed chamber wherein the gases liberated by the decomposition may collect and from which chamber they are discharged into an external cell, which is non-metallically connected with the outer electrode. These gases are discharged in such manner into the external cell as to create a circulation of the electrolyte through such cell and through the outer electrode. The outer cell is so arranged that it may be efficiently cooled by radiation which, with the circulation of the electrolyte above referred to and the heat absorbing qualities of the gases (particularly of hydrogen) maintains the apparatus relatively cool.

Figure 4:
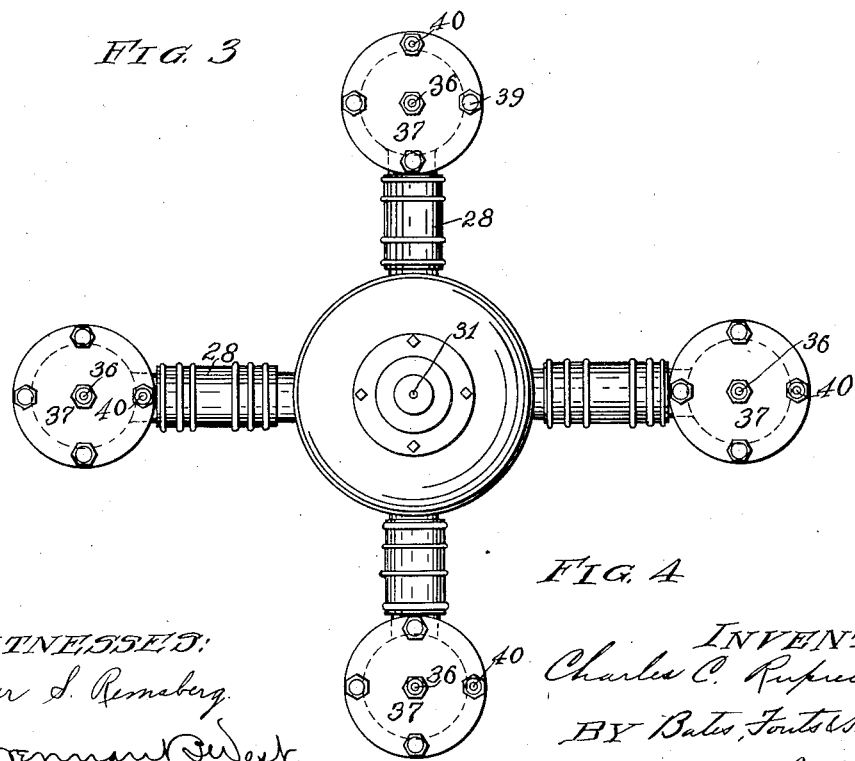
Figure 5:
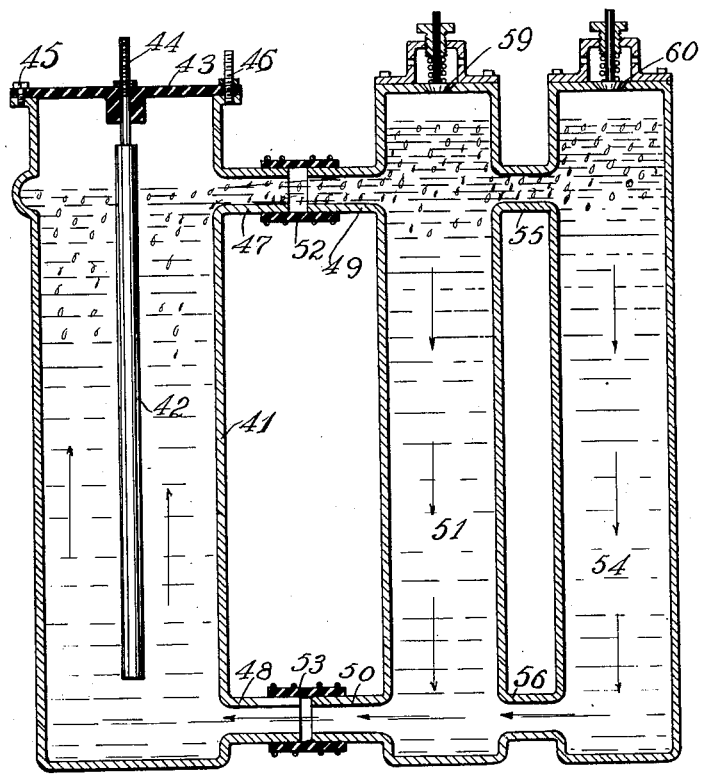
Figure 6:
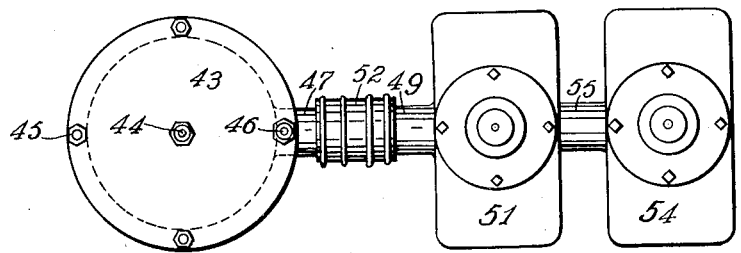

Referring now to the drawings, Figure 1 represents a sectional view taken through one form of apparatus constructed in accordance with my invention; Fig. 2 represents a top plan view of the apparatus shown in the preceding figure; Figs. 3 and 4 represent views, similar to Figs. 1 and 2, of a modified form of my apparatus; Figs. 5 and 6 represent views, similar to Figs. 1 and 2 respectively, of a modified form of my invention; and Figs. 7 and 8 represent views, similar to Figs. 1 and 2, respectively, of a still further modified form of my invention.

Describing the parts by reference characters, 1 denotes a cylindrical electrode of conductive material which will not be decomposed by the action of the electrolyte.

2 denotes the inner electrode. This electrode is carried by a head 3 resting upon a closure 4 for the upper end of electrode 1. Closure 4 may be threaded into the upper end of electrode 1, as shown, and may be of conductive material, in which case terminal 5 may be connected directly thereto. Head 3 is shown as composed of non-conducting material and may be provided with a central hub or sleeve 6 projecting through closure 4. Electrode 2 will be preferably carried by a rod 7 extending through said hub or sleeve and forming a gas-tight joint therewith. The upper end of this rod may form the other terminal for the rectifier.

Electrode 1 is provided with a pair of nipples or connections 8 and 9 projecting respectively from below the top and above the bottom thereof. By means of these connections the outer electrode is placed in communication with the external cell. This cell, in general form, resembles a radiator and comprises a plurality of vertical loops or branches 10 which are connected at points adjacent to the bottoms thereof by nipples 11, said loops communicating with a common chamber 12 at the top thereof. The first loop in the series is connected to nipple or connection 8 by means of a non-current-conducting sleeve 13, whereby the external cell will not be metallically connected with electrode 1. The last loop 10ª of the series is provided with a lateral nipple 14 near the upper end thereof which is connected to a downwardly extending pipe 15 which, in turn, is connected to nipple or connection 9 by means of an insulating connection 16 similar to connection 13. It will be noted that the main body of the cell is located above the electrodes 1 and 2, the purpose of which will be explained hereinafter. The cell is provided with a filling orifice 17 through which the electrolyte may be inserted thereinto, said orifice being provided with a closure 18. The upper end of the cell is also provided with a valve 19, adapted to seat downwardly and provided with a spring 20 and an adjusting nut 21 for varying the tension of the spring and hence the pressure at which valve 19 will open.

In operation, the electrolyte does not completely fill the cell, an air space being provided at the upper end of the cell, as indicated. Current being supplied to the apparatus, the electrolytic action proceeds in the usual manner. The gases liberated by the passage of the current between the electrodes accumulate within the chamber formed at the upper end of outer electrode 1, displacing the electrolyte within said electrode. These gases flow through connection 8 into the external cell, exercising an aspirating effect upon the liquid within electrode 1, in the manner explained in connection with the rectifier of my application No. 402,597, filed November 18, 1907. The gases circulate upwardly through the loops of the cell into the chamber formed in the upper portion thereof. The elevation of the cell above the electrode 1 increases the pressure opposed to the circulation of the gases and increases the heat-absorbing effect of such gases upon the electrolyte. It also gives a long path for the gases and hence increases their cooling effects upon the electrolyte. By means of the pressure relief valve 19, I regulate the pressure under which the gases will circulate. This increased pressure cuts down the loss due to leakage currents, facilitates the formation of the insulating film on the cathode, and reduces the resistance of the electrolytic solution, all of which increase the efficiency of the apparatus. This pressure further increases the density of the gases evolved, thereby greatly increasing their heat capacity and causing them to convey a large amount of heat from their place of origin where heat is most objectionable, to other parts of the apparatus from which it can be more easily dissipated. By means of the spring 20 and the adjusting nut 21, the pressure maintained within the cell may be adjusted, as occasion requires. As is the case with the construction shown in my prior application referred to hereinbefore, the aspirating effect of the gases upon the electrolyte in the electrode 1 causes the circulation of the electrolyte throughout the apparatus, as indicated by the arrows. The construction and arrangement of the cell in this case and the circulation under pressure enhance the cooling effect and increase the capacity and efficiency of the rectifier.

In the embodiment of my invention illustrated in Figs. 3 and 4, I employ a single external cell which is common to a plurality of groups of electrodes. In said modification, 22 denotes the external cell around which are grouped the outer electrodes 23. These electrodes are each provided with connections 24 and 25 projecting respectively from below the top and above the bottom thereof and connected to corresponding nipples or connections 26 and 27 carried by the external cell 22. As in the case of the preceding modification, there is no metallic connection between the cell 22 and the outer electrodes 23, the ends of the connections 24, 26 and 25, 27 being spaced apart and said nipples being connected by non-conducting sleeves 28. The cell 22 extends above the tops of electrodes 23 and is provided in the top thereof with an air chamber 29 provided with a downwardly seating valve 30 having a stem 31 projecting through an adjusting nut 32 mounted in a bracket 33. By means of nut 32, the tension of spring 34 may be varied to regulate the pressure under which valve 30 shall open. The inner electrode 35 is carried by a rod 36 extending through the cover 37 and adapted at its outer end for connection with an electrical conductor. Cover 37 is shown as made of insulating material and has a central extension or sleeve 38 for rod 36. Cover 37 may be secured to the top of electrode 33 in any suitable manner, as by bolts 39. 40 denotes the terminal for electrode 33. This terminal may extend through cover 39 and be threaded or otherwise electrically connected to electrode 23. In this form of my invention, as in the preceding form, the gases liberated by electrolysis accumulate within the chambers formed in the outer electrodes above connections 24 and escape thence into the external cell, being subjected to the pressure of the column of electrolyte above such connections and to the pressure maintained by valve 30. The electrolyte will circulate from the outer electrodes into the central cell and thence through the lower connections back into the outer electrodes, as indicated by the arrows. The gases will pass upwardly through the electrolyte in cell 22 and will absorb a large amount of heat therefrom, such heat absorption being increased by the pressure exerted upon the electrolyte as explained in connection with the preceding embodiment of my invention.

In Figs. 5 and 6 there is shown a still further modification of my invention, wherein a single outer electrode is in communication with an external radiating cell consisting of a plurality of vertical branches or loops, said branches or loops being of about the same height as the outer electrode and having each in the top thereof a pressure valve. In the last mentioned views, 41 denotes the outer electrode, 42 the inner electrode which is adjustably carried from cover 43 similar to cover 37 in the preceding modification, by means of a rod 44, the upper end of which may constitute one of the electrical terminals. Cover 43 may be of insulating material, secured to the flanged upper end of cell 41 by bolts 45. 46 denotes a terminal extending through the cover and connected with the flanged end of electrode 41. 47 and 48 denote connections projecting from electrode 41 from below the top and above the bottom thereof respectively. The connections are connected with corresponding connections 49 and 50, respectively, projecting from one of the loops 51 of the external cell. Connections 47 and 48 are spaced from connections 49 and 50, the former connections being connected to the latter by means of sleeves 52 and 53 of non-conducting material. The external cell comprises any suitable number of vertical loops or branches 51, 54, connected at their upper and lower portions by means of nipples 55 and 56. Each of these loops has in the upper portion thereof an air chamber having a valve-controlled aperture. 59 and 60 denote the valves for the two branches or loops illustrated. These valves are identical in construction and operation with the valves 19 and 30 of the two preceding modifications and need no further or detailed description.

In Figs. 7 and 8, there is illustrated a still further modification of my invention, wherein a single external electrode is shown as communicating with an external radiating cell consisting of a pair of spiral coils. One of these coils communicates with the connection which is located below the closed top of the outer electrode and the other coil with the connection which projects from a point adjacent to the bottom of the outer electrode and both coils are in communication at their upper ends by means of an expansion chamber having a filling orifice and a valve controlled outlet, similar to the filling orifice and outlet in the modification shown in Figs. 1 and 2.

In Figs. 7 and 8, 61 denotes the inner electrode, which is suspended from the cover 62 by means of rod 63 adapted to form one terminal for the current supplied between the electrodes. Cover 62 may be secured to the top of outer electrode 64 in the same manner as the cover in the two preceding modifications. 65 denotes the other current terminal connecting with the outer electrode. Electrode 64 is provided with a connection 66 projecting from below the top thereof to provide a gas collecting chamber between said top and said connection. Connection 66 is non-metallically connected to the external cell by means of the insulating sleeve 67. The cell in this case comprises two coils 68 and 69. The former coil is connected at its lower end to electrode 64 by the sleeve 67 and the latter coil is connected at its lower end to electrode 64 by means of connection 70 projecting from the lower portion of said electrode and sleeve 71 of insulating material. At their upper ends, coils 68 and 69 communicate with an expansion chamber 72 which is provided with a filling orifice 73 and with a port 74 having a pressure valve 75 similar to the valves shown in the preceding modification. The operation of this form of my invention is similar to that of the form shown in Figs. 1 and 2. The gases produced by the electrolytic action pass upwardly through the coil 68 into the chamber 72, exercising an aspirating effect upon the liquid within the outer electrode and producing a circulation of the electrolyte throughout both coils of the external cell and between the electrodes. The passage of the gases through the coils 68 is retarded by the circuitous path through which the gases travel, the pressure due to the height of the column of liquid through which the gases must pass, and the pressure due to the valve 75. This form of my invention provides for efficiently cooling the electrolyte and the apparatus, not only by the heat absorption by the gases, but by the large radiating surface of the external cell.

In the operation of all four forms of my apparatus disclosed herein, there is a circulation from the outer electrode through an external cell which has no metallic connection with said electrode. The gases liberated by the electrolytic action are collected in a chamber and are circulated under pressure through the electrolyte in an external cell. The advantages of exerting pressure upon the electrolyte and the circulating gases have been explained hereinbefore. By constructing and locating the cell as described, the cooling effect upon the electrolyte is increased, both by radiation from the cell and the heat-condensing action of the gases, which action is increased by affording a long path for the gases through the electrolyte.

For the electrolyte, I have found the following solution to be very effective: bibasic ammonium phosphate 20 parts, tannic acid 1 part; glycerin 10 parts; water 100 parts.

Having thus described my invention, I claim:

1. In an electrolytic rectifier for alternating currents, of the type wherein gases are evolved upon the passing of current there through, the combination, with a cell having electrodes and an electrolyte, of means for obstructing the discharge of such gases from the cell, whereby there is maintained upon said electrolyte a pressure greater than atmospheric.

2. In an electrolytic rectifier for alternating currents, the combination, with a cell having electrodes and an electrolyte, and a receptacle communicating therewith and containing electrolyte, the connection between said cell and receptacle being so arranged that the gases produced by the electrolysis will pass from said cell to said receptacle, of means for obstructing the escape of said gases from said receptacle, whereby there is maintained upon said electrolyte a pressure greater than atmospheric.

3. In an electrolytic rectifier for alternating currents, the combination, with a system of closed, intercommunicating receptacles, one of said receptacles having electrodes and forming an electrolytic cell, and all of said receptacles being substantially filled with electrolyte, the connection between said cell and the remainder of said receptacles being so arranged that the gases produced by the electrolysis will pass from said cell to said receptacle, and said receptacles being formed at their upper portion with discharge apertures for the gases, of outwardly opening spring-pressed valves closing said discharge opening whereby there is maintained upon said electrolyte a pressure greater than atmospheric.

4. In an electrolytic rectifier for alternating currents, of the type wherein gases are evolved upon the passing of current therethrough, the combination, with a cell having electrodes and an electrolyte, of means independent of the amount of electrolyte in said cell for maintaining upon said electrolyte a pressure greater than atmospheric.

5. In an electrolytic rectifier for alternating currents, the combination, with a cell having electrodes and an electrolyte, of means for discharging the gases produced by the electrolysis through the body of the electrolyte in a plurality of paths, and means independent of the height of the electrolyte within said cell for maintaining thereon a pressure greater than atmospheric.

6. In a rectifier, the combination, with an upright cell, of a pair of electrodes, connections for transmitting current through the electrolyte between said electrodes, a cell external to said electrodes and at one side thereof, and laterally extending connections for circulating the gases liberated by electrolysis through said external cell.

7. In a rectifier, the combination of a pair of electrodes, a cell external to said electrodes, means for discharging gases generated by the decomposition of the electrolyte into said cell, said cell being provided with an outlet for gas, a pressure valve controlling said outlet, and means for adjusting the pressure under which said valve may open.

8. In a rectifier, the combination of an inner electrode, an outer electrode surrounding the same and having a gas-collecting chamber therein, a cell external to said outer electrode and communicating with said chamber and with said electrode at points below said chamber, said cell being provided with an outlet for gas, an automatically opening valve controlling said outlet, a spring resisting the opening of said valve, and means for adjusting said spring, substantially as specified.

9. In a rectifier, the combination of an inner and an outer electrode, the outer electrode being provided with a gas-collecting chamber therein, an external cell, connections between said cell and said outer electrode for discharging the gases from said chamber into said cell and for circulating the electrolyte therethrough, a gas-escape outlet in said cell, and means for adjusting the pressure at which gas may escape through said outlet.

10. In a rectifier, the combination of an inner and an outer electrode, a cell external to the outer electrode, and connections whereby an electrolyte may circulate through said external cell and within said outer electrode, said connections comprising non-current-conducting unions.

11. In a rectifier, the combination of an inner and an outer electrode, said outer electrode being closed and being provided with vertically-spaced ports, an external cell comprising a plurality of connected members or loops, and non-current conducting connections between one of said members or loops and said ports.

12. In a rectifier, the combination of an inner and an outer electrode, said outer electrode being closed and being provided with vertically spaced ports, an external cell comprising a plurality of vertically extending connected members or loops, and non-current conducting connections between one of said members or loops and said ports.

13. In a rectifier, the combination of an inner and an outer electrode, and an external cell extending above said outer electrode and connected therewith by vertically spaced ports, said outer electrode having a gas-collecting chamber adapted to discharge through the upper port.

14. In a rectifier, the combination of an inner and an outer electrode, an external cell comprising a plurality of vertically extending branches or loops connected by vertically spaced nipples or connections, a connection between said outer electrode and the lower end of one of said loops or branches, and a connection between the upper portion of the last loop or branch of said cell and the lower portion of said outer electrode.

15. In a rectifier, the combination of an inner and an outer electrode, an external cell comprising a plurality of vertically extending branches or loops connected by vertically spaced ports and having a common chamber at the upper ends thereof, a connection between said outer electrode and the lower end of one of said loops or branches, and a connection between the upper portion of the last loop or branch of said cell and the lower portion of said electrode.

16. In a rectifier, the combination of an inner and an outer electrode, an external cell located at one side of and extending above said outer electrode, a lateral connection between the upper portion of said outer electrode and the lower portion of said cell, and a lateral connection between the upper portion of said cell and the lower portion of said outer electrode.

17. In a rectifier, the combination of an inner and an outer electrode, an external cell extending above said outer electrode, a connection between the upper portion of said outer electrode and the lower portion of said cell, a connection between the upper portion of said cell and the lower portion of said outer electrode, a valve-controlled outlet in the upper portion of said cell, and means for discharging gases from the space between said electrodes into said cell.

18. In a rectifier, the combination of a pair of electrodes, a cell having a gas escape outlet, means for adjusting the pressure at which gases may escape from said outlet, and connections for circulating an electrolyte through said cell and between said electrodes and for circulating the gases liberated by electrolysis through the electrolyte in said cell.

In testimony whereof, I hereunto affix my signature in the presence of two witnesses.

CHARLES C. RUPRECHT.

Witnesses:
J. B. HULL,
A. J. HUDSON.